United States Patent
Berger et al.

(10) Patent No.: US 11,942,092 B2
(45) Date of Patent: Mar. 26, 2024

(54) COMPUTING RESOURCE-SAVING VOICE ASSISTANT

(71) Applicant: SAGEMCOM BROADBAND SAS, Rueil Malmaison (FR)

(72) Inventors: Jérôme Berger, Rueil Malmaison (FR); Cédric Bouchon, Rueil Malmaison (FR)

(73) Assignee: SAGEMCOM BROADBAND SAS, Rueil Malmaison (FR)

(*) Notice: Subject to any disclaimer, the term of this patent is extended or adjusted under 35 U.S.C. 154(b) by 0 days.

(21) Appl. No.: 17/777,474

(22) PCT Filed: Oct. 7, 2020

(86) PCT No.: PCT/EP2020/078176
§ 371 (c)(1),
(2) Date: May 17, 2022

(87) PCT Pub. No.: WO2021/099024
PCT Pub. Date: May 27, 2021

(65) Prior Publication Data
US 2022/0406312 A1  Dec. 22, 2022

(30) Foreign Application Priority Data
Nov. 18, 2019  (FR) .................................. FR1912847

(51) Int. Cl.
*G10L 15/32* (2013.01)
*G10L 15/08* (2006.01)
*G10L 15/22* (2006.01)
*G10L 15/30* (2013.01)
*G10L 21/0208* (2013.01)
*G10L 21/0272* (2013.01)

(52) U.S. Cl.
CPC .............. *G10L 15/32* (2013.01); *G10L 15/08* (2013.01); *G10L 15/22* (2013.01); *G10L 15/30* (2013.01); *G10L 21/0208* (2013.01); *G10L 21/0272* (2013.01); *G10L 2015/088* (2013.01); *G10L 2015/223* (2013.01); *G10L 2021/02082* (2013.01)

(58) Field of Classification Search
USPC .......................... 704/246, 247, 251, 252, 275
See application file for complete search history.

(56) References Cited

U.S. PATENT DOCUMENTS

2014/0334645 A1* 11/2014 Yun .......................... G10L 15/22
                                                              381/110
2015/0370531 A1   12/2015 Faaborg
(Continued)

*Primary Examiner* — Leonard Saint-Cyr
(74) *Attorney, Agent, or Firm* — Muncy, Geissler, Olds & Lowe, P.C.

(57) ABSTRACT

A voice assistant includes an electronic processor unit connected to at least one microphone and to remote equipment. The electronic processor unit includes both single detection modules for detecting respective single keywords from an audio signal supplied by the microphone, and also a control unit connected to the single detection modules to select predetermined actions as a function of the detected keywords and to perform those actions. The control module is also arranged to detect whether actions are doable and to activate or deactivate the single detection modules as a function of the doability of the actions.

23 Claims, 3 Drawing Sheets

(56) References Cited

U.S. PATENT DOCUMENTS

| | | | |
|---|---|---|---|
| 2016/0042748 A1 | 2/2016 | Jain et al. | |
| 2019/0295542 A1* | 9/2019 | Huang | G06F 3/167 |
| 2019/0362714 A1* | 11/2019 | Mori | G10L 15/22 |
| 2020/0098354 A1* | 3/2020 | Lin | G10L 15/1807 |
| 2021/0074309 A1* | 3/2021 | Dusan | G10L 15/08 |

* cited by examiner

COMPUTING RESOURCE-SAVING VOICE ASSISTANT

The present invention relates to the field of computing.

BACKGROUND OF THE INVENTION

Voice assistants are known that are capable of recognizing a plurality of keywords and of undertaking different actions depending on the recognized keywords. A voice assistant is an electronic device comprising a computer processor unit connected to a microphone and to one or more peripherals such as a TV decoder, a home automation server, and an Internet gateway allowing direct access to services available on the network, such as: home delivery of a wide variety of food or non-food goods; making telephone calls (VoIP); supplying information; . . . . In order to trigger an action, the user needs merely to utter the keyword associated with the peripheral and a request corresponding to the desired use of the peripheral in question.

In order to manage the use of a plurality of keywords, the computer processor unit may make use of:
 a plurality of detectors each associated with a respective keyword; or
 a multi-stage detector in which a first stage detects whether a keyword is present in the signal supplied by the microphone, and a second stage is arranged to identify the keyword and the peripheral associated therewith.

The first solution ensures detection of maximum quality, since each detector has settings for only one particular keyword. Nevertheless, that requires all of the detectors to be kept active continuously, which is greedy in computational resources. Also, there is a risk of a plurality of detectors considering simultaneously that they have detected their respective associated keywords, leading to a risk of confusion in selecting which action is to be executed.

The second solution is less greedy in computational resources since only the first stage is activated continuously, and only one keyword is identified by the second stage. In contrast, detection quality is not as good as with the first solution.

The search continues for solutions that save on computational resources while providing detection of sufficient quality.

However, it can happen that the peripherals or services that are actuated by the keywords are not available, in particular because the peripherals are not connected to the processor unit or because the user does not have the right to access some particular service. Whatever the solution used, the processor unit nevertheless seeks to detect the keywords, unnecessarily impacting the computational resources of the computer processor unit. Furthermore, when the computer processor unit is connected to a sound playback unit and drives it, the computer processor unit is arranged to lower the sound volume that is played each time a keyword is detected in order to allow better detection of the request following the keyword. This is completely pointless if the action associated with the keyword cannot be performed.

OBJECT OF THE INVENTION

A particular object of the invention is to improve the operation of voice assistants.

SUMMARY OF THE INVENTION

To this end, the invention provides a voice assistant comprising an electronic processor unit having a connection port connected to at least one microphone and at least one connection port connected to pieces of remote equipment, the electronic processor unit comprising both single detection modules for detecting respective single keywords from an audio signal supplied by the microphone to the electronic processor unit and also a control unit connected to the single detection modules to select predetermined actions as a function of detection signals supplied by the single detection modules and to perform those actions, the control module also being arranged:
 to detect whether actions are doable;
 to activate or deactivate the single detection modules as a function of the doability of the actions.

Thus, each of the detection modules is activated only when the action associated with the keyword that it is arranged to detect can be performed. Under such circumstances, computational resources are consumed only by those detection modules that are suitable for triggering actions that are doable, thereby avoiding wasting such resources.

The invention also provides a method of controlling a voice assistant that is connected to pieces of remote equipment and that comprises both an electronic processor unit comprising single detection modules for detecting respective single keywords in an audio signal and also a control unit connected to the single detection modules.

The method comprises the step of selecting predetermined actions as a function of detection signals supplied by the single detection modules and of performing those actions. The method further comprises the steps of:
 detecting whether actions are doable;
 activating or deactivating the single detection modules as a function of the doability of the actions.

The invention also provides a computer program implementing this method and a storage medium containing such a program.

Other characteristics and advantages of the invention appear on reading the following description of particular, nonlimiting embodiments of the invention.

BRIEF DESCRIPTION OF THE DRAWINGS

Reference is made to the accompanying drawings, in which.

DETAILED DESCRIPTION OF THE INVENTION

Figure 1:
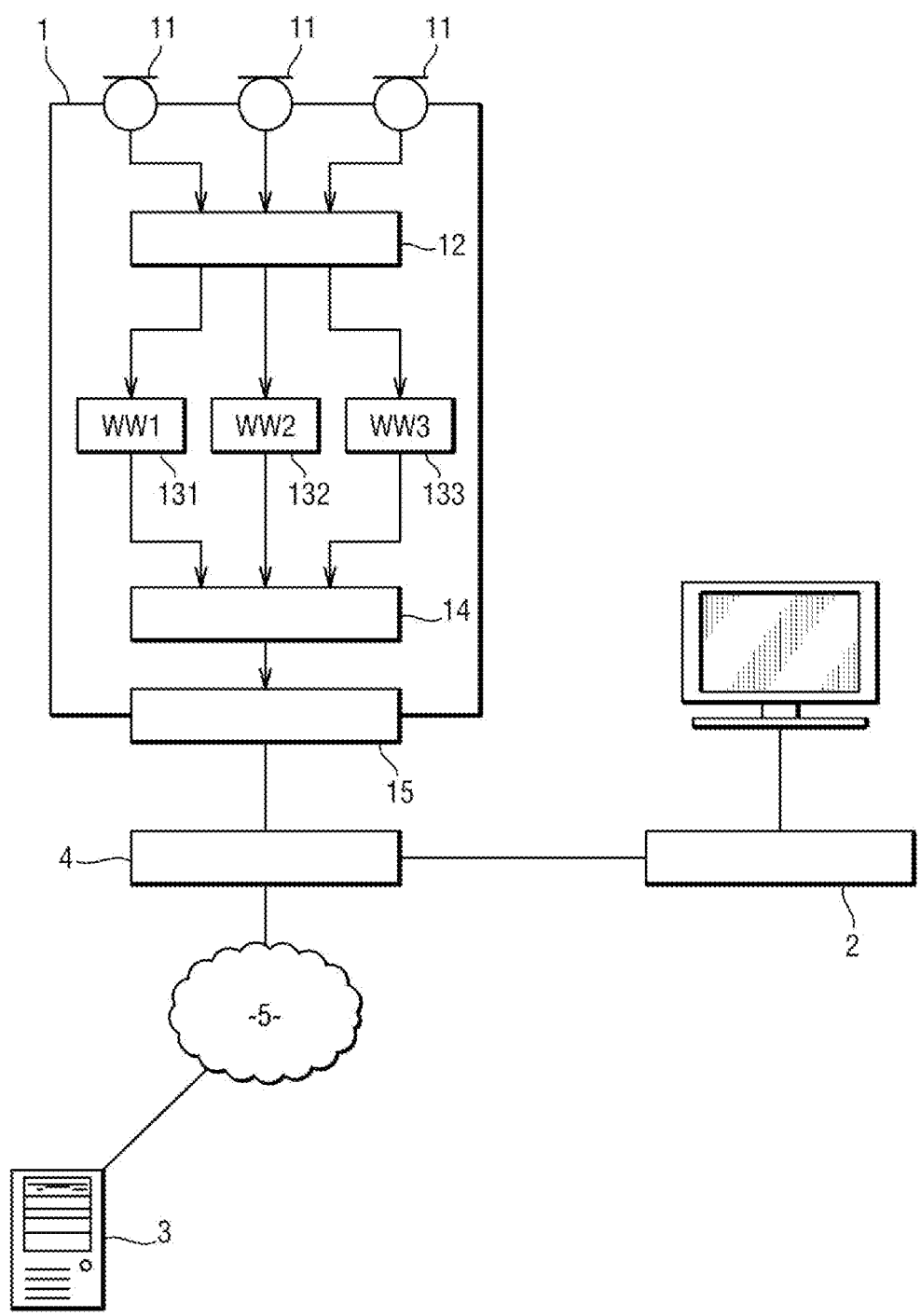
FIG. 1 is a diagrammatic view of a voice assistant in a first embodiment.

With reference to FIG. 1, the voice assistant in a first embodiment comprises an electronic processor unit, given overall reference 1, having first connection ports, each connected to a respective microphone 11, and at least one second connection port connected to a network interface 15. In this example, the network interface 15 is connected to a router 4 that is connected firstly to a TV decoder 2 and secondly to the Internet 5, which is in turn connected to a server 3 offering services over the Internet.

The electronic processor unit 1 comprises a processor and a memory for executing a computer program. The electronic processor unit 1 is thus arranged to allow a user to perform predetermined actions by using keywords for designating each of these actions, which actions may consist, for example, in controlling the TV decoder 2 or the server 3 in order to access one or another of the services it offers. For this purpose, the user has a list associating each of the predetermined actions with a respective keyword. For the purposes of simplifying the description, in this example there are three actions that are associated with three keywords WW1, WW2, and WW3. Naturally this number could be greater or smaller.

For this purpose, the first connection ports are also connected to inputs of an audio processor module 12 arranged to apply at least one process to the audio signals supplied by the microphones 11. More precisely, in this example, the audio processor module 12 is arranged:
to equalize the audio signals;
to suppress any noise that might be present in the audio signals;
to cancel any echoes that might be present in the audio signals.

Preferably, the audio processor module 12 is also arranged to process the audio signals so as to isolate sound coming from a particular direction. This makes it possible to limit the influence of background noise and makes the keywords stand out.

Such audio processing that serves to facilitate detecting keywords in the audio signals, is itself known and is not described in greater detail herein.

The audio processor module 12 has outputs connected to respective single detection modules 131, 132, and 133 for detecting single keywords. The single detection modules 131, 132, and 133 all perform the same detection program, but with different settings adapted to respective keywords. Suitable detection programs are themselves known, and by way of example comprise: the program "TrulyHandsFree" from the supplier Sensory, the program "Snowboy" from the supplier Kitt.Al, or the freeware "Mycroft Precise". Each of the single detection modules 131, 132, and 133 is thus arranged:
to detect only one keyword—respectively WW1, WW2, or WW3—in the processed audio signal that is applied thereto by the audio processor module 12;
to issue a detection signal on detecting the keyword WW1, WW3, or WW3 in question in the audio signal.

Each single detection module 131, 132, and 133 has an output connected to a respective input of a control module 14. The control module 14 has a memory containing a table associating the predetermined actions and the detection signals corresponding to the keywords associated with each of the predetermined actions, and it executes the predetermined action that corresponds to the detection signal it receives. The action in question generally comprises sending to a remote server the audio signal in which the keyword has been detected (the audio processor module 12 being connected directly to the control module 14) in such a manner that the remote server interprets the request following the keyword and potentially returns an instruction to the control module 14, which instruction is executable by the control unit 14 and corresponds to the request following the keyword.

The table also has priorities associated with the actions in such a manner that, if two of the single detection modules 131, 132, and 133 issue respective detection signals simultaneously, the control module 14 executes the higher priority one of the two actions corresponding to the keywords.

Figure 3:
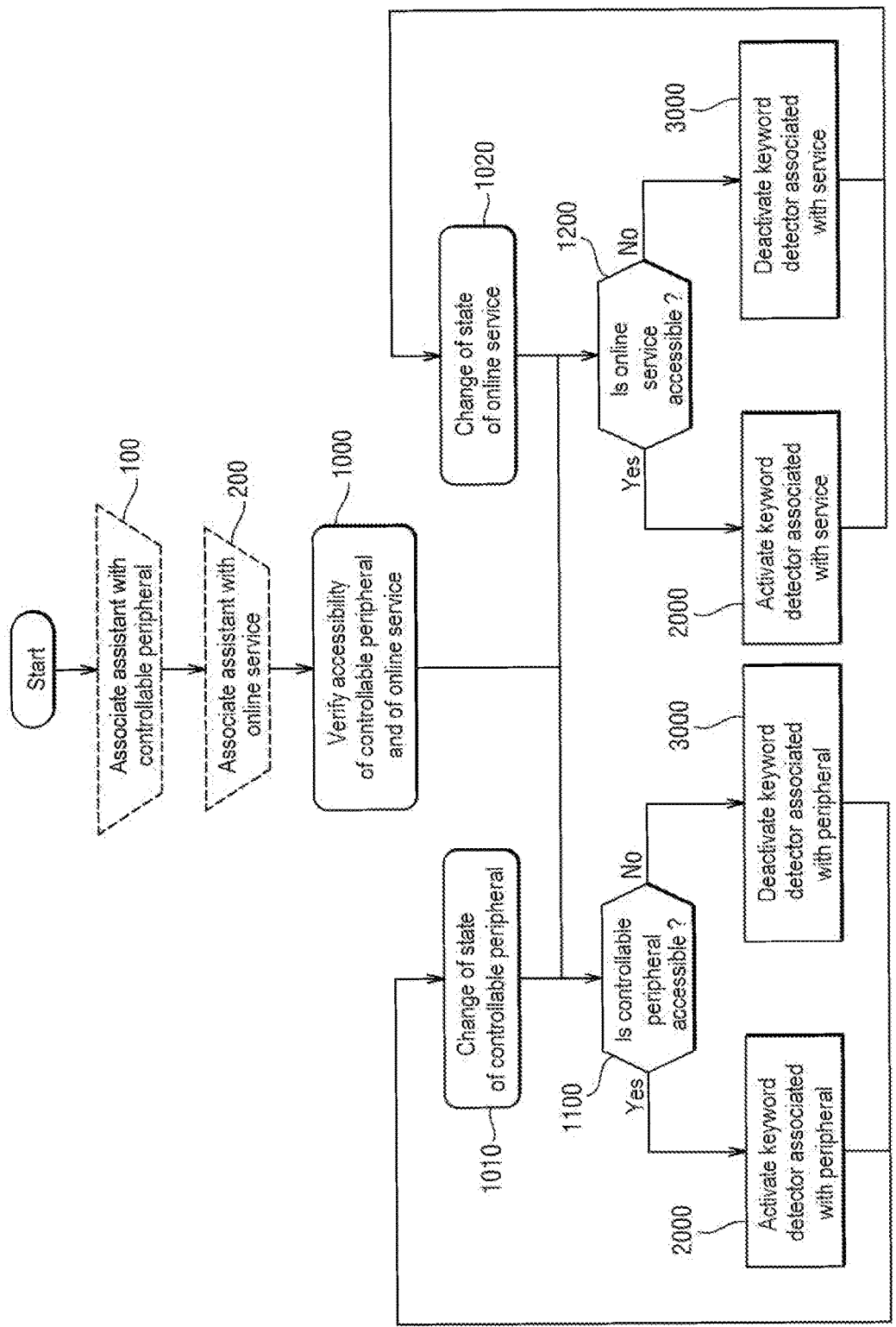
FIG. 3 shows the method of the invention.

With reference also to FIG. 3, the program executed by the control module 14 is arranged:
to detect whether the actions are doable (step 1000);
to activate (step 2000) or deactivate (step 3000) the single detection modules as a function of the doability of the actions.

More precisely, the control module 14 is programmed:
to verify that the peripherals are reachable via the connection ports of the electronic processor unit 1 (operation symbolized as 1100) and to consider that any action that needs to be performed by one of the peripherals is not doable if that peripheral is not reachable (peripheral not connected, not powered, or faulty, . . . );
to verify whether the services offered by the server 3 are accessible (operation symbolized as 1200) and to consider any action corresponding to one of the services or needing to be performed by the server 3 is not doable if the server is not accessible (faulty server, faulty router, network overloaded with response times that are too long, service interrupted or not set-up, user not having rights to access the service, or no longer having such rights, . . . ).

Preferably, these verifications are undertaken periodically, with a predefined period or when triggered by the operator of a test stage. These verifications can also be initiated by the user whenever the user connects or disconnects a peripheral leading to a change of its state (step 1010) or by an organization supplying an online service and informing the voice assistant that the service is accessible for the user in question or is no longer accessible (step 1020). It should be observed that, when the voice assistant is put into operation, it is preferable to perform both an operation of associating the voice assistant with the peripherals with which the voice assistant is to be connected directly (step 100 in FIG. 3) and also an operation of associating the voice assistant with the services that the voice assistant can call on via the server (step 200 in FIG. 3).

For example, if the control module 14 communicates with the TV decoder 2, or with any other peripheral, and with the server 3 by means of a smart protocol (such as the transmission control protocol (TCP)) that makes provision for so-called "keepalive" messages to be exchanged periodically in order to verify that the connection between them is still present, then the control module 14 considers an action that is to be performed via said connection to the doable providing said message has been received within a length of time that is shorter than a predetermined threshold. If the TV decoder 2, or any other peripheral, communicates with the control module 14 via a protocol of the multicast domain name system (mDNS) type, then the control module 14 listens to messages sent by the peripherals in order to announce their availability, and it considers that any action that is to be performed via a peripheral to be doable providing the peripheral has announced its availability within a length of time that is shorter than a predetermined threshold. Following a predetermined number of unsuccessful attempts, the control module 14 may also consider for some predetermined duration that an action that is normally performed via the TV decoder 2 or the server 3 is not doable. The control module can thus attempt periodically to set up a connection with each of the peripherals and/or servers via which actions are to be performed.

In an example of an operation, the keyword WW1 is a command for the decoder 2, the keyword WW2 is a command for a first service of the server 3, and the keyword WW3 is a command for a second service of the server 3. The control module 14 is thus arranged:
to deactivate the single detection module 131 if the decoder 2 is not connected or is faulty;

to deactivate the single detection module 132 if the first service is not available;

to deactivate the single detection module 133 if the second service is not available;

in general manner, to deactivate all of the single detection modules corresponding to respective actions that are not doable and on the contrary to activate all of the single detection modules corresponding to respective actions that are doable.

There follows a description of the second embodiment. In the description below, elements that are identical or analogous to those described above are given the same numerical references.

Figure 2:
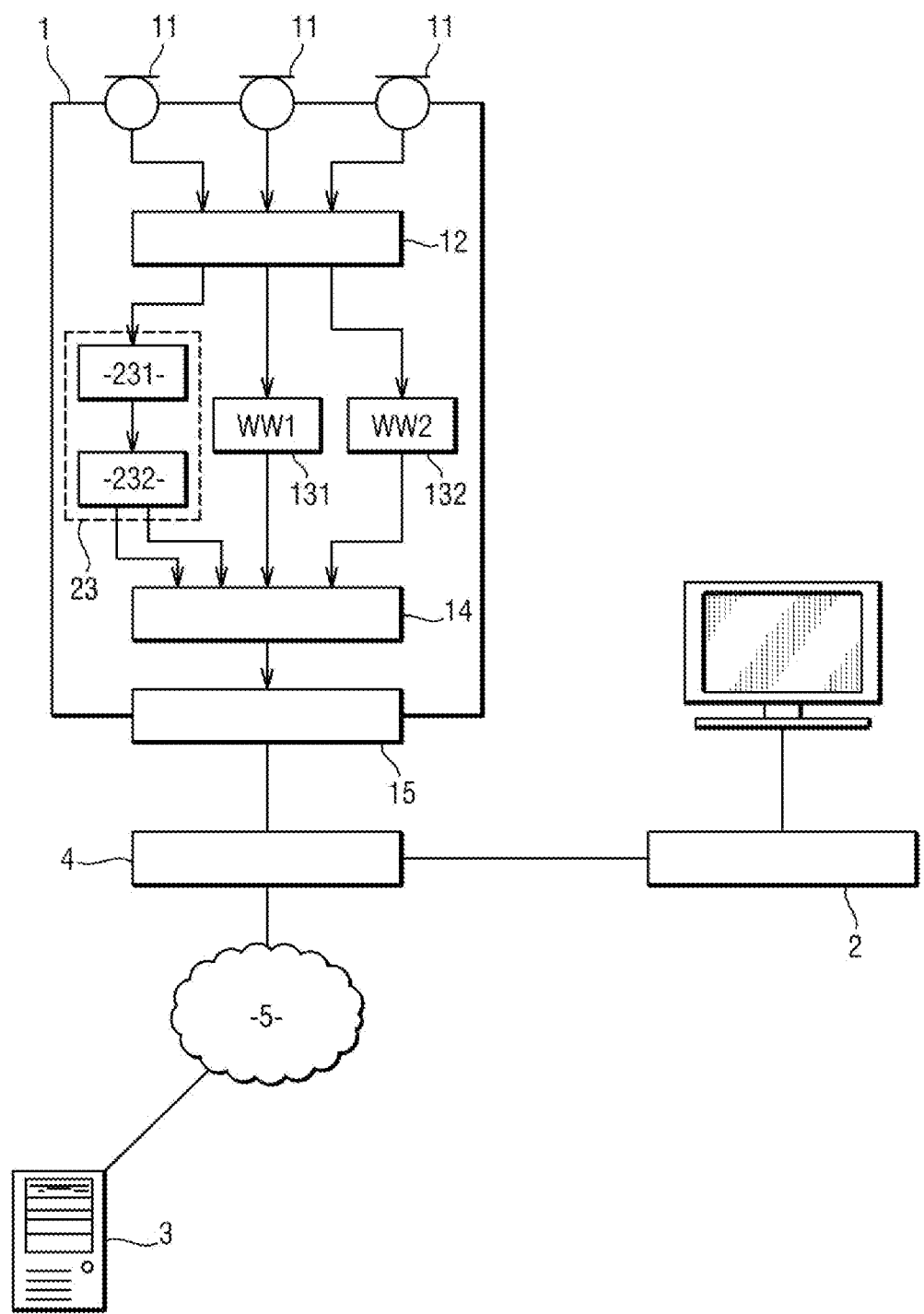
FIG. 2 is a diagrammatic view of a voice assistant in a second embodiment.

In the second embodiment as shown in FIG. 2, the computer processor unit 1 is arranged to trigger two actions as a function of two keywords WW1 and WW2, and it has two single detection modules 131 and 132 that are identical to those described above, together with a multiple detection module 23 for detecting multiple keywords and that comprises in conventional manner a first stage 231 for detecting the presence of a keyword in an audio signal transmitted by the audio processor module 12, and a second stage 232 for identifying the keyword in question and for issuing a detection signal corresponding to the identified keyword to the control module 14.

In the present example, the multiple detection module 23 is arranged to detect the keywords WW1 and WW2 of all of the predetermined actions, and it has a respective single detection module 131, 132 for each predetermined action. The control module 14 is arranged:

when all of the actions are doable, to activate the multiple detection module 23 and deactivate all of the single detection modules 131 and 132;

when only one of the predetermined actions is doable, to activate the single detection module 131 or 132 for the keyword corresponding to the doable action, and deactivate the multiple detection module 23;

when none of the actions is doable, to deactivate all of the detection modules 23, 131, and 132.

In a variant, it is possible to make provision for at least one of the predetermined actions to be associated with a keyword that can be detected solely by the multiple detection module 23. By way of example, this applies when an action is added to the list of predetermined actions and no single detection module has been provided for the keyword corresponding to said added action. In contrast, the multiple detection module 23 can be set up to detect the new keyword. The control module 14 is then arranged:

when all of the actions are doable, to activate the multiple detection module 23 and deactivate all of the single detection modules;

when only some of the actions are doable, to activate the single detection module(s) for the keyword(s) corresponding to the doable action(s) and/or the multiple detection module if one of the doable actions is associated with a keyword that can be detected solely by the multiple detection module;

when none of the actions is doable, to deactivate all of the detection modules.

In another variant, when none of the actions is doable, the control module may be arranged:

to activate the multiple detection module 23 and deactivate all of the single detection modules 131 and 132;

to issue an error signal if a keyword is detected by the multiple detection module 23.

By way of example, the error signal may be sent in the form of a sound message played through a loudspeaker of the voice assistant or a visual message displayed on a screen or by a light of the voice assistant.

Naturally, the invention is not limited to the embodiments described, but covers any variant coming within the ambit of the invention as defined by the claims.

In particular, the structure of the electronic processor unit may be different from that described.

The electronic processor unit may comprise a single processor executing a computer program having different portions that form the different modules. The electronic processor unit could equally well comprise physical modules that are dedicated to the different functions, e.g. a processor dedicated to signal processing (DSP), a processor dedicated to detecting keywords, and a processor dedicated to control.

The computation means of the electronic processor unit may comprise one or more processors, one or more microcontrollers, one or more field programmable gate arrays (FPGAs) . . . .

The computer program executed by the control unit may be installed in the memory of the control unit in the factory, or it may be downloaded from an external connection port once the port has been connected to a network or to a computer, or it may be downloaded from a data medium (such as a removable memory of the universal serial bus (USB) key type, or a memory card) containing said program.

The number of single and/or multiple detection modules may be modified.

The term "remote equipment" is used to cover a peripheral such as a TV decoder, a server connected to the Internet, a computer connected to the voice assistant, . . . . The number of pieces of remote equipment connected to the voice assistant and the types of that equipment may differ from the above description. Pieces of remote equipment may be connected to distinct ports of the electronic processor unit 1 or to a router that is connected to a single port of the electronic processor unit 1.

The voice assistant may be connected to one or more microphones.

The voice assistant may have one or more loudspeakers for playing an audio signal coming from the network to which it is connected or from a terminal to which it is connected, e.g. a terminal of smartphone type. Under such circumstances, the control module 14 is advantageously arranged to lower the sound volume temporarily after detecting a keyword in order to facilitate detection of the request following the keyword.

The electronic processor unit 1 may be equipped with an audio processor module that performs only a portion of the processing described, or that performs other processing. The step of improving the audio signal may thus comprise some or all of the operations listed (equalizing the audio signal, suppressing noise and/or echoes, processing a plurality of audio signals in order to isolate sound coming from a particular direction) or it may comprise other processing. The electronic processor unit 1 need not have an audio processor module. The step of improving the audio signal is thus optional.

If two detection modules issue respective detection signals simultaneously and if no priorities are allocated to the corresponding actions, then the control module 14 may be arranged to issue an error signal, e.g. requesting repetition of the keyword.

If two detection modules issue respective detection signals simultaneously and if no priorities are allocated to the corresponding actions, then the detection modules may be arranged to issue respective confidence scores that are representative of the quality with which keywords have been detected. The control module 14 may then be arranged to perform the action that corresponds to the keyword having the higher confidence score.

When a service has been configured to be normally accessible from the voice assistant, but the service is temporarily inaccessible (e.g. a network disturbance), then the control module 14 is advantageously arranged not to deactivate the single detection module corresponding to an action that uses the service. If two keywords are detected simultaneously and one of the keywords corresponds to an action that is temporarily not doable, then the control module 14 executes the other action providing it is doable. If a plurality of keywords have been detected and if two of the keywords correspond to actions that are doable, then the control module 14 executes the higher priority action from among the doable actions. On the contrary, if no action is doable, then no action is executed and an error signal is issued.

It is possible to deactivate a keyword detection module by increasing its detection threshold so much that the probability of detection becomes very low unless the keyword is uttered very distinctly and without any background noise: the keyword detection module then becomes almost inoperative under normal conditions.

The detection modules may be components that are specialized in detection. They may have a plurality of components that are identical associated with operating settings that are different and adapted to the keyword(s) they are to detect.

The invention claimed is:

1. A voice assistant comprising an electronic processor unit having a connection port connected to at least one microphone and at least one connection port connected to pieces of remote equipment, the electronic processor unit comprising both single detection modules each arranged for detecting a single keyword from an audio signal supplied by the microphone to the electronic processor unit and also a control unit connected to the single detection modules to select predetermined actions as a function of detection signals supplied by the single detection modules and to make those actions done by a server and/or a peripheral device to be linked to the voice assistant, the control module also being arranged:
to detect whether some of the predetermined actions are doable by the server and/or the peripheral device; and
to activate or deactivate the single detection modules as a function of the doability of the actions so that the only single detection modules that are activated are those suitable for detecting in the audio signal keyword triggering a predetermined action that has been detected as doable.

2. The voice assistant according to claim 1, wherein the electronic control unit also comprises a multiple detection module for detecting multiple keywords.

3. The voice assistant according to claim 2, wherein, when none of the actions is doable, the control module is arranged to deactivate all of the detection modules.

4. The voice assistant according to claim 1, wherein the control module is arranged to verify that the pieces of remote equipment are reachable via the ports of the electronic processor unit and to consider any action that is to be performed via a piece of remote equipment is not doable if that peripheral device is not reachable.

5. The voice assistant according to claim 4, wherein the audio processor module is arranged to equalize the audio signal.

6. The voice assistant according to claim 4, wherein the audio processor module is arranged to suppress noise in the audio signal.

7. The voice assistant according to claim 4, wherein the audio processor module is arranged to cancel echoes in the audio signal.

8. The voice assistant according to claim 4, wherein the electronic processor unit is connected to a plurality of microphones, and the audio processor module is arranged to process the audio signals so as to isolate sound coming from a particular direction.

9. The voice assistant according to claim 1, wherein one of the ports of the electronic processor unit is connected to a network and the control module is arranged:
to verify whether the server of the network is accessible;
to consider any action that is to be performed by that server is not doable if the server is not accessible.

10. The voice assistant according to claim 1, wherein the electronic processor unit includes an audio processor module between the microphone and the detection modules.

11. The voice assistant according to claim 1, wherein the single detection modules are identical in structure with operating settings that are different and adapted to each keyword.

12. A voice assistant comprising an electronic processor unit having a connection port connected to at least one microphone and at least one connection port connected to pieces of remote equipment, the electronic processor unit comprising both single detection modules for detecting respective keywords from an audio signal supplied by the microphone to the electronic processor unit, and also a control unit connected to the single detection modules to select predetermined actions as a function of detection signals supplied by the single detection modules and to make those actions done by a server and/or a peripheral device to be linked to the voice assistant, the control module also being arranged:
to detect whether actions are doable by the server and/or the peripheral device; and
to activate or deactivate the single detection modules as a function of the doability of the actions,
wherein the electronic control unit also comprises a multiple detection module for detecting multiple keywords, and
wherein, if the multiple detection module is arranged to detect the keywords of all of the predetermined actions, and if there is a respective single detection module for each predetermined action, then the control module is arranged:
when all of the actions are doable, to activate the multiple detection module and deactivate all of the single detection modules; and
when only some of the actions are doable, to activate the single detection module(s) for the keyword(s) corresponding to the doable action(s), and deactivate the multiple detection module.

13. A voice assistant comprising an electronic processor unit having a connection port connected to at least one microphone and at least one connection port connected to pieces of remote equipment, the electronic processor unit comprising both single detection modules for detecting respective keywords from an audio signal supplied by the microphone to the electronic processor unit, and also a control unit connected to the single detection modules to select predetermined actions as a function of detection signals supplied by the single detection modules and to make those actions done by a server and/or a peripheral device to be linked to the voice assistant, the control module also being arranged:
- to detect whether actions are doable by the server and/or the peripheral device; and
- to activate or deactivate the single detection modules as a function of the doability of the actions,
- wherein the electronic control unit also comprises a multiple detection module for detecting multiple keywords, and
- wherein, if at least one of the predetermined actions is associated with a keyword that is detectable solely by the multiple detection module, the control module is arranged:
  - when all of the actions are doable, to activate the multiple detection module and deactivate all of the single detection modules; and
  - when only some of the actions are doable, to activate the single detection module(s) for the keyword(s) corresponding to the doable action(s) and/or the multiple detection module if one of the doable actions is associated with a keyword that can be detected solely by the multiple detection module.

14. A voice assistant comprising an electronic processor unit having a connection port connected to at least one microphone and at least one connection port connected to pieces of remote equipment, the electronic processor unit comprising both single detection modules for detecting respective keywords from an audio signal supplied by the microphone to the electronic processor unit, and also a control unit connected to the single detection modules to select predetermined actions as a function of detection signals supplied by the single detection modules and to make those actions done by a server and/or a peripheral device to be linked to the voice assistant, the control module also being arranged:
- to detect whether actions are doable by the server and/or the peripheral device; and
- to activate or deactivate the single detection modules as a function of the doability of the actions,
- wherein the electronic control unit also comprises a multiple detection module for detecting multiple keywords, and
- wherein, when none of the actions is doable, the control module is arranged:
  - to activate the multiple detection module and deactivate all of the single detection modules; and
  - to issue an error signal if a keyword is detected by the multiple detection module.

15. A method of controlling a voice assistant that is connected to pieces of remote equipment and that comprises both an electronic processor unit comprising single detection modules each arranged for detecting a single keyword in an audio signal and also a control unit connected to the single detection modules, the method comprising the step of selecting predetermined actions as a function of detection signals supplied by the single detection modules and of making those actions done by a server and/or a peripheral device to be linked to the voice assistant, the method further comprising the steps of:
- detecting whether some of the predetermined actions are doable by the server and/or the peripheral device; and
- activating or deactivating the single detection modules as a function of the doability of the actions so that the only single detection modules that are activated are those suitable for detecting in the audio signal keyword triggering a predetermined action that has been detected as doable.

16. The method according to claim 15, including the step of deactivating all of the detection modules when none of the actions is doable.

17. The method according to claim 15, including the steps of verifying that the pieces of remote equipment are reachable by the electronic processor unit, and of considering that any action that is to be performed via a piece of remote equipment is not doable if that device is not reachable.

18. The method according to claim 15, wherein the electronic processor unit is connected to a network, and the method includes the steps of:
- verifying whether the server of the network is accessible;
- considering any action that is to be performed by that server is not doable if the server is not accessible.

19. The method according to claim 15, including a step of improving the audio signal prior to detecting keywords.

20. The method according to claim 19, wherein the step of improving the audio signal comprises at least one of the following operations:
- equalizing the audio signal;
- suppressing noise in the audio signal;
- cancelling echoes in the audio signal;
- processing a plurality of audio signals in order to isolate sound coming from a particular direction.

21. A non-transitory computer-readable storage medium containing a computer program arranged to be executed by the processor unit of the voice assistant, the program including instructions arranged to perform the method according to claim 15.

22. A method of controlling a voice assistant that is connected to pieces of remote equipment and that comprises both an electronic processor unit comprising single detection modules for detecting respective keywords in an audio signal and also a control unit connected to the single detection modules, the method comprising the step of selecting predetermined actions as a function of detection signals supplied by the single detection modules and of making those actions done by a server and/or a peripheral device to be linked to the voice assistant, the method further comprising the steps of:
- detecting whether actions are doable by the server and/or the peripheral device; and
- activating or deactivating the single detection modules as a function of the doability of the actions,
- wherein the electronic control unit also comprises a multiple detection module for detecting multiple keywords and the method comprises the steps of:
  - if the multiple detection module is arranged to detect the keywords of all of the predetermined actions, and if there is a respective single detection module for each predetermined action:
    - when all of the actions are doable, activating the multiple detection module and deactivating all of the single detection modules; and
    - when only some of the predetermined actions are doable, activating the single detection module(s) for the keyword(s) corresponding to the doable action(s), and deactivating the multiple detection module; and
  - if at least one of the predetermined actions is associated with a keyword that can be detected solely by the multiple detection module, the control module is arranged:

when all of the actions are doable, to activate the multiple detection module and deactivate all of the single detection modules; and when only some of the actions are doable, to activate the single detection module(s) for the keyword(s) corresponding to the doable action(s) and/or the multiple detection module if one of the doable actions is associated with a keyword that can be detected solely by the multiple detection module.

23. A method of controlling a voice assistant that is connected to pieces of remote equipment and that comprises both an electronic processor unit comprising single detection modules for detecting respective keywords in an audio signal and also a control unit connected to the single detection modules, the method comprising the step of selecting predetermined actions as a function of detection signals supplied by the single detection modules and of making those actions done by a server and/or a peripheral device to be linked to the voice assistant, the method further comprising the steps of:

detecting whether actions are doable by the server and/or the peripheral device; and activating or deactivating the single detection modules as a function of the doability of the actions; and when none of the actions is doable, the steps of:
activating the multiple detection module and deactivating all of the single detection modules; and
issuing an error signal if a keyword is detected by the multiple detection module.

* * * * *